(12) United States Patent
Schwarz (10) Patent No.: US 12,047,604 B2
(45) Date of Patent: Jul. 23, 2024

(54) APPARATUS, A METHOD AND A COMPUTER PROGRAM FOR VOLUMETRIC VIDEO

(71) Applicant: Nokia Technologies Oy, Espoo (FI)

(72) Inventor: Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 310 days.

(21) Appl. No.: 17/439,463

(22) PCT Filed: Mar. 19, 2020

(86) PCT No.: PCT/FI2020/050173
§ 371 (c)(1),
(2) Date: Sep. 15, 2021

(87) PCT Pub. No.: WO2020/188148
PCT Pub. Date: Sep. 24, 2020

(65) Prior Publication Data
US 2022/0159297 A1    May 19, 2022

Related U.S. Application Data

(60) Provisional application No. 62/820,362, filed on Mar. 19, 2019.

(51) Int. Cl.
*H04N 19/597* (2014.01)
*G06T 15/04* (2011.01)
(Continued)

(52) U.S. Cl.
CPC ........... *H04N 19/597* (2014.11); *G06T 15/04* (2013.01); *G06T 15/10* (2013.01); *H04N 13/178* (2018.05); *H04N 19/20* (2014.11); *H04N 19/70* (2014.11)

(58) Field of Classification Search
CPC .... H04N 19/597; H04N 13/178; H04N 19/20; H04N 19/70; H04N 19/46; G06T 15/04; G06T 15/10; G06T 2207/10028
See application file for complete search history.

(56) References Cited

U.S. PATENT DOCUMENTS

| | | | |
|---|---|---|---|
| 2012/0039383 A1 | 2/2012 | Huang et al. | 375/240.02 |
| 2013/0243104 A1 | 9/2013 | Chen et al. | 375/240.29 |

(Continued)

FOREIGN PATENT DOCUMENTS

| | | |
|---|---|---|
| EP | 1 746 839 A1 | 1/2007 |
| WO | WO-2013/065673 A | 4/2015 |

(Continued)

OTHER PUBLICATIONS

Information technology—Coded Representation of Immersive Media—Part5:Video-basedPointCloud compression, ISO/IECJTC1/ SC 29/WG 11, ISO/IEC 23090-5:2019, MPEG W18180, 2019, 1 02pages. (Year: 2019).*

(Continued)

*Primary Examiner* — Hesham K Abouzahra
(74) *Attorney, Agent, or Firm* — Joseph C. Drish; Harrington & Smith (57) ABSTRACT

There are disclosed a method and an apparatus for video encoding. A method can include projecting a 3D representation of at least one object onto at least one 2D patch (400); generating a geometry image, a texture image, an occupancy map and auxiliary patch information from the 2D patch, wherein the auxiliary patch information comprises metadata relating to properties of the patch and one or more indicators for configuring reconstruction of the 3D representation of the at least one object (402); and encoding the geometry image, the texture image, the occupancy map and the auxiliary patch information in or along a bitstream (404).

21 Claims, 5 Drawing Sheets

(51) Int. Cl.
*G06T 15/10* (2011.01)
*H04N 13/178* (2018.01)
*H04N 19/20* (2014.01)
*H04N 19/70* (2014.01)

(56) References Cited

U.S. PATENT DOCUMENTS

| | | | |
|---|---|---|---|
| 2014/0152657 A1* | 6/2014 | Johnston | G06F 3/0412 345/419 |
| 2020/0045344 A1 | 2/2020 | Boyce et al. | |
| 2021/0297696 A1* | 9/2021 | Nakagami | H04N 19/167 |

FOREIGN PATENT DOCUMENTS

| | | |
|---|---|---|
| WO | WO-2019/129923 A1 | 7/2019 |
| WO | 2020/012071 A1 | 1/2020 |

OTHER PUBLICATIONS

Kharchenko, "V-PCC Codec description", 3DG, ISO/IEC JTC1/SC29AWG11 MPEG 2018/N18017, Oct. 2018) 2pages. (Year: 2018).*

Extended European Search Report received for corresponding European Patent Application No. 20773593.7, dated Dec. 15, 2022, 8 pages.

"Information technology—Coded Representation of Immersive Media—Part 5: Video-based Point Cloud Compression", ISO/IEC JTC 1/SC 29/WG 11, ISO/IEC 23090-5:2018, 2018, 72 pages.

"Information technology—Coded Representation of Immersive Media—Part 5: Video-based Point Cloud Compression", ISO/IEC JTC 1/SC 29/WG 11, ISO/IEC 23090-5:2019, MPEG W18180, 2019, 102 pages.

"Information technology—Dynamic adaptive streaming over HTTP (DASH)—Part 1: Media presentation description and segment formats", ISO/IEC 23009-1, May 15, 2014, 152 pages.

International Search Report and Written Opinion received for corresponding Patent Cooperation Treaty Application No. PCT/FI2020/050173, dated Sep. 3, 2020, 18 pages.

Pesonen et al., "PCC TMC2 patch material & functionality signaling", Nokia Technologies, ISO/IEC JTC1/SC29/WG11 MPEG2018/m43730, Jul. 2018, 4 pages.

Pesonen et al., "[PCC] On Attiribute Coding (CE2.15)", Nokia, ISO/IEC JTC1/SC29/WG11 MPEG2018/ m44735, Oct. 2018, 10 pages.

Zakharchenko, "V-PCC Codec description", 3DG, ISO/IEC JTC1/SC29/WG11 MPEG2018/N18017, Oct. 2018, 32 pages.

* cited by examiner

APPARATUS, A METHOD AND A COMPUTER PROGRAM FOR VOLUMETRIC VIDEO

RELATED APPLICATION

This application was originally filed as PCT Application No. PCT/FI2020/050173, filed on Mar. 19, 2020, which claims priority to U.S. Provisional Application No. 62/820,362, filed on Mar. 19, 2019, each of which is incorporated herein by reference in its entirety.

TECHNICAL FIELD

The present invention relates to an apparatus, a method and a computer program for volumetric video coding.

BACKGROUND

Volumetric video data represents a three-dimensional scene or object and can be used as input for virtual reality (VR), augmented reality (AR) and mixed reality (MR) applications. Such data describes the geometry, e.g. shape, size, position in three-dimensional (3D) space, and respective attributes, e.g. colour, opacity, reflectance and any possible temporal changes of the geometry and attributes at given time instances. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are triangle meshes, point clouds (PCs), or voxel arrays. Point clouds are well suited for applications such as capturing real world 3D scenes where the topology is not necessarily a 2D manifold. A point cloud frame may be defined as a point cloud corresponding to a particular time instant; for example, the point cloud may have been captured at that time instant. Successive point cloud frames may be considered to form a point cloud sequence or point cloud video.

In dense point clouds or voxel arrays, the reconstructed 3D scene may contain tens or even hundreds of millions of points. One way to compress a time-varying volumetric scene/object is to project 3D surfaces to some number of pre-defined 2D planes. Regular 2D video compression algorithms can then be used to compress various aspects of the projected surfaces. For example, a time-varying 3D point cloud, with spatial and texture coordinates, can be mapped into a sequence of at least two sets of planes, where one of the two sets carry the texture data and the other carries the distance of the mapped 3D surface points from the projection planes. After decoding, a 3D representation is reconstructed by projecting the 2D pixels back into 3D space.

However, the resulting 3D representation does not carry any information about the nature of reconstructed 3D object, i.e. it is only a hollow 3D surface in 3D space. Nevertheless, many applications, for example in medical imaging, immersive media entertainment and autonomous navigation, would benefit from such information, e.g. if a 3D object forms a solid object, or if there are any cavities inside the object.

SUMMARY

Now, an improved method and technical equipment implementing the method has been invented, by which the above problems are alleviated. Various aspects include a method, an apparatus and a computer readable medium comprising a computer program or a signal stored therein, which are characterized by what is stated in the independent claims. Various details of the embodiments are disclosed in the dependent claims and in the corresponding images and description.

According to a first aspect, there is provided a method comprising projecting a 3D representation of at least one object onto at least one 2D patch; generating a geometry image, a texture image, an occupancy map and auxiliary patch information from the 2D patch, wherein the auxiliary patch information comprises metadata relating to properties of the patch and one or more indicators for configuring reconstruction of the 3D representation of said at least one object; and encoding the geometry image, the texture image, the occupancy map and the auxiliary patch information in or along a bitstream.

According to a second example, there is provided an apparatus comprising at least one processor and at least one memory, said at least one memory stored with computer program code thereon, the at least one memory and the computer program code configured to, with the at least one processor, cause the apparatus at least to perform: project a 3D representation of at least one object onto at least one 2D patch; generate a geometry image, a texture image, an occupancy map and auxiliary patch information from the 2D patch, wherein the auxiliary patch information comprises metadata relating to properties of the patch and one or more indicators for configuring reconstruction of the 3D representation of said at least one object; and encode the geometry image, the texture image, the occupancy map and the auxiliary patch information in a bitstream.

According to a third example, there is provided an apparatus comprising: means for projecting a 3D representation of at least one object onto at least one 2D patch; means for generating a geometry image, a texture image, an occupancy map and auxiliary patch information from the 2D patch, wherein the auxiliary patch information comprises metadata relating to properties of the patch and one or more indicators for configuring reconstruction of the 3D representation of said at least one object; and means for encoding the geometry image, the texture image, the occupancy map and the auxiliary patch information in a bitstream.

According to an embodiment, said one or more indicators provide a sequence-level signalling for configuring reconstruction of the 3D representation of all objects represented by all patches within said bitstream.

According to an embodiment, a syntax element, which may be referred to as sps_sequence_volume_indicator, is added to a sequence parameter set syntax or any other suitable syntax structure for ISO/IEC 23090-5 (or similar volumetric video coding technology).

According to an embodiment, said one or more indicators provide an object-level signalling for configuring reconstruction of the 3D representation of one or more objects represented by one or more patches within said bitstream.

According to an embodiment, a syntax element, which may be referred to as gpm_geometry_patch_volume_indicator, is added to a geometry patch parameters syntax or any other suitable syntax structure for ISO/IEC 23090-5 (or similar volumetric video coding technology).

According to an embodiment, said one or more indicators provide a patch-level signalling for configuring reconstruction of the 3D representation of a 3D surface represented by said patch within said bitstream.

According to a fourth example, there is provided a method comprising: receiving a bitstream in a decoder, said bitstream comprising an encoded geometry image, texture image, occupancy map and auxiliary patch information from a 2D patch, wherein the auxiliary patch information comprises metadata relating to properties of the patch and one or more indicators for configuring reconstruction of a 3D representation of at least one object; decoding the geometry image, the texture image, the occupancy map and the auxiliary patch information; and reconstructing a 3D representation of said at least one object based on the decoded geometry image, texture image, occupancy map and at least one indicator for configuring reconstruction of the 3D representation of the object.

According to a fifth example, there is provided an apparatus comprising at least one processor and at least one memory, said at least one memory stored with computer program code thereon, the at least one memory and the computer program code configured to, with the at least one processor, cause the apparatus at least to perform: receive a bitstream in a decoder, said bitstream comprising an encoded geometry image, texture image, occupancy map and auxiliary patch information from a 2D patch, wherein the auxiliary patch information comprises metadata relating to properties of the patch and one or more indicators for configuring reconstruction of a 3D representation of at least one object; decode the geometry image, the texture image, the occupancy map and the auxiliary patch information; and reconstruct a 3D representation of said at least one object based on the decoded geometry image, texture image, occupancy map and at least one indicator for configuring reconstruction of the 3D representation of the object.

According to a sixth example, there is provided an apparatus comprising: means for receiving a bitstream in a decoder, said bitstream comprising an encoded geometry image, texture image, occupancy map and auxiliary patch information from a 2D patch, wherein the auxiliary patch information comprises metadata relating to properties of the patch and one or more indicators for configuring reconstruction of a 3D representation of at least one object; means for decoding the geometry image, the texture image, the occupancy map and the auxiliary patch information; and means for reconstructing a 3D representation of said at least one object based on the decoded geometry image, texture image, occupancy map and at least one indicator for configuring reconstruction of the 3D representation of the object.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

In the following, several embodiments of the invention will be described in the context of point cloud models for volumetric video coding. It is to be noted, however, that the invention is not limited to specific scene models or specific coding technologies. In fact, the different embodiments have applications in any environment where coding of volumetric scene data is required.

A video codec comprises an encoder that transforms the input video into a compressed representation suited for storage/transmission, and a decoder that can un-compress the compressed video representation back into a viewable form. An encoder may discard some information in the original video sequence in order to represent the video in a more compact form (i.e. at lower bitrate).

Volumetric video may be captured using one or more three-dimensional (3D) cameras. When multiple cameras are in use, the captured footage is synchronized so that the cameras provide different viewpoints to the same world. In contrast to traditional 2D/3D video, volumetric video describes a 3D model of the world where the viewer is free to move and observer different parts of the world.

Volumetric video enables the viewer to move in six degrees of freedom (6DOF): in contrast to common 360° video, where the user has from 2 to 3 degrees of freedom (yaw, pitch, and possibly roll), a volumetric video represents a 3D volume of space rather than a flat image plane. Volumetric video frames contain a large amount of data because they model the contents of a 3D volume instead of just a two-dimensional (2D) plane. However, only a relatively small part of the volume changes over time. Therefore, it may be possible to reduce the total amount of data by only coding information about an initial state and changes which may occur between frames. Volumetric video can be rendered from synthetic 3D animations, reconstructed from multi-view video using 3D reconstruction techniques such as structure from motion, or captured with a combination of cameras and depth sensors such as LiDAR (Light Detection and Ranging), for example.

Volumetric video data represents a three-dimensional scene or object, and thus such data can be viewed from any viewpoint. Volumetric video data can be used as an input for augmented reality (AR), virtual reality (VR) and mixed reality (MR) applications. Such data describes geometry (shape, size, position in 3D-space) and respective attributes (e.g. color, opacity, reflectance, . . . ), together with any possible temporal changes of the geometry and attributes at given time instances (e.g. frames in 2D video). Volumetric video is either generated from 3D models, i.e. computer-generated imagery (CGI), or captured from real-world scenes using a variety of capture solutions, e.g. a multi-camera, a laser scan, a combination of video and dedicated depths sensors, etc. Also, a combination of CGI and real-world data is possible. Examples of representation formats for such volumetric data are triangle meshes, point clouds, or voxel. Temporal information about the scene can be included in the form of individual capture instances, i.e. "frames" in 2D video, or other means, e.g. position of an object as a function of time.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications, such as capturing real world 3D scenes where the topology is not necessarily a 2D manifold. Another way to represent 3D data is coding this 3D data as a set of texture and depth map as is the case in the multi-view plus depth. Closely related to the techniques used in multi-view plus depth is the use of elevation maps, and multi-level surface maps.

In 3D point clouds, each point of each 3D surface is described as a 3D point with color and/or other attribute information such as surface normal or material reflectance. Point cloud is a set of data points in a coordinate system, for example in a three-dimensional coordinate system being defined by X, Y, and Z coordinates. The points may represent an external surface of an object in the screen space, e.g. in a three-dimensional space.

In dense point clouds or voxel arrays, the reconstructed 3D scene may contain tens or even hundreds of millions of points. If such representations are to be stored or interchanged between entities, then efficient compression of the presentations becomes fundamental. Standard volumetric video representation formats, such as point clouds, meshes, voxel, suffer from poor temporal compression performance. Identifying correspondences for motion-compensation in 3D-space is an ill-defined problem, as both, geometry and respective attributes may change. For example, temporal successive "frames" do not necessarily have the same number of meshes, points or voxel. Therefore, compression of dynamic 3D scenes is inefficient. 2D-video based approaches for compressing volumetric data, i.e. multiview with depth, have much better compression efficiency, but rarely cover the full scene. Therefore, they provide only limited 6DOF capabilities.

Instead of the above-mentioned approach, a 3D scene, represented as meshes, points, and/or voxel, can be projected onto one, or more, geometries. These geometries may be "unfolded" or packed onto 2D planes (two planes per geometry: one for texture, one for depth), which are then encoded using standard 2D video compression technologies. Relevant projection geometry information may be transmitted alongside the encoded video files to the decoder. The decoder decodes the video and performs the inverse projection to regenerate the 3D scene in any desired representation format (not necessarily the starting format).

Projecting volumetric models onto 2D planes allows for using standard 2D video coding tools with highly efficient temporal compression. Thus, coding efficiency can be increased greatly. Using geometry-projections instead of 2D-video based approaches based on multiview and depth, provides a better coverage of the scene (or object). Thus, 6DOF capabilities are improved. Using several geometries for individual objects improves the coverage of the scene further. Furthermore, standard video encoding hardware can be utilized for real-time compression/decompression of the projected planes. The projection and the reverse projection steps are of low complexity.

Figure 1A:
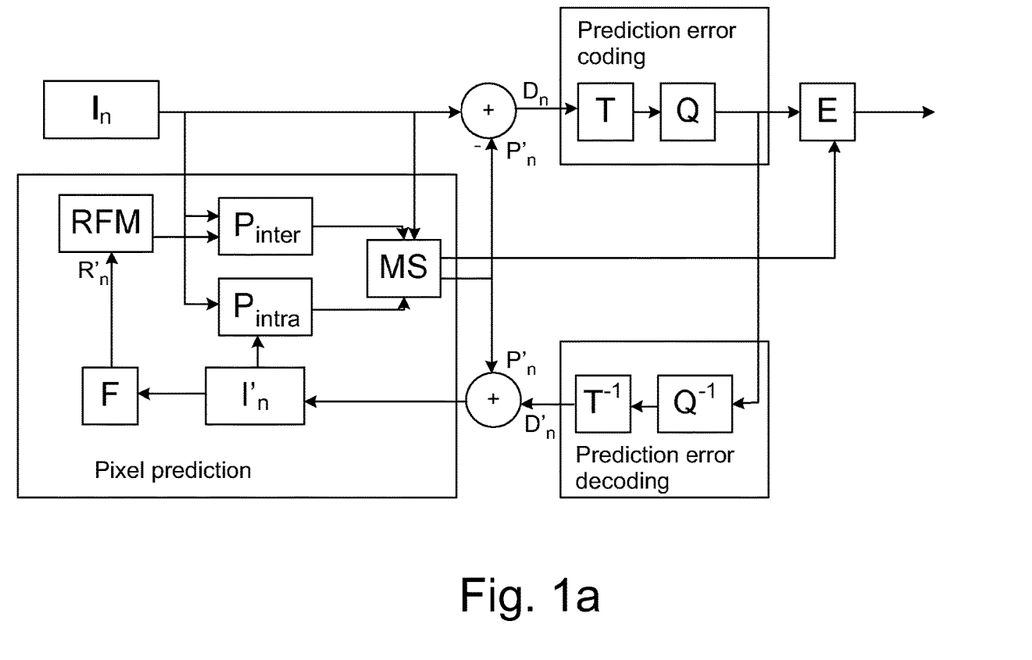
FIGS. 1a and 1b show an encoder and decoder for encoding and decoding 2D pictures.
Figure 1B:
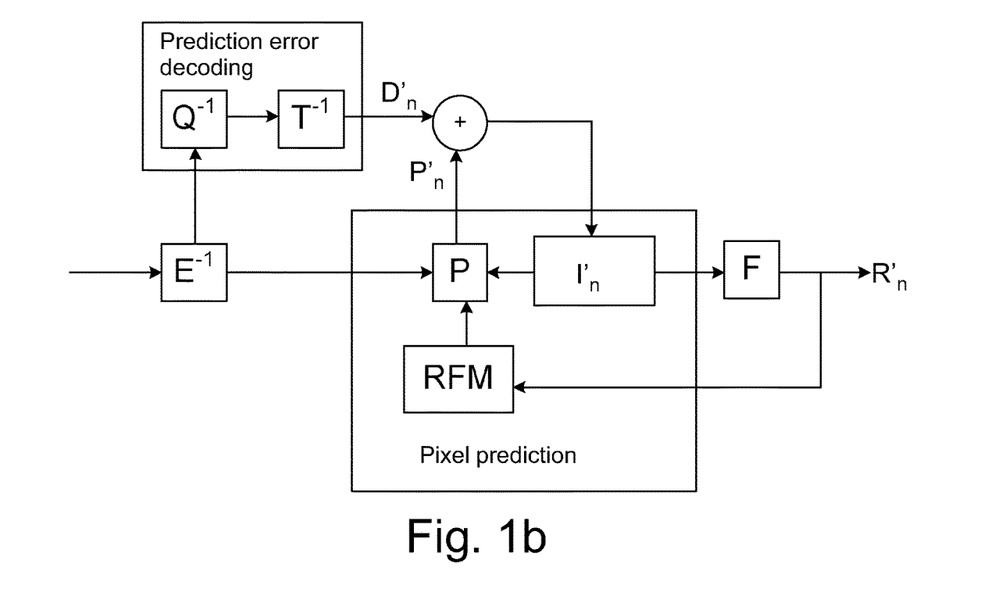

FIGS. 1a and 1b show an encoder and decoder for encoding and decoding the 2D texture pictures, geometry pictures and/or auxiliary pictures. A video codec consists of an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate). An example of an encoding process is illustrated in FIG. 1a. FIG. 1a illustrates an image to be encoded (I$''$); a predicted representation of an image block (P$'''$); a prediction error signal (D$''$); a reconstructed prediction error signal (D$'''$); a preliminary reconstructed image (I$'''$); a final reconstructed image (R$'''$); a transform (T) and inverse transform (T$^{-1}$); a quantization (Q) and inverse quantization (Q$^{-1}$); entropy encoding (E); a reference frame memory (RFM); inter prediction (P$_{inter}$); intra prediction (P$_{intra}$); mode selection (MS) and filtering (F).

An example of a decoding process is illustrated in FIG. 1b. FIG. 1b illustrates a predicted representation of an image block (P$'''$); a reconstructed prediction error signal (D$'''$); a preliminary reconstructed image (I$'''$); a final reconstructed image (R$'''$); an inverse transform (T$^{-1}$); an inverse quantization (Q$^{-1}$); an entropy decoding (E$^{-1}$); a reference frame memory (RFM); a prediction (either inter or intra) (P); and filtering (F).

Many hybrid video encoders encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate). Video codecs may also provide a transform skip mode, which the encoders may choose to use. In the transform skip mode, the prediction error is coded in a sample domain, for example by deriving a sample-wise difference value relative to certain adjacent samples and coding the sample-wise difference value with an entropy coder.

Many video encoders partition a picture into blocks along a block grid. For example, in the High Efficiency Video Coding (HEVC) standard, the following partitioning and definitions are used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

A first texture picture may be encoded into a bitstream, and the first texture picture may comprise a first projection of texture data of a first source volume of a scene model onto a first projection surface. The scene model may comprise a number of further source volumes.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive such as a point to the projection surface is determined for the pixels. Such depth data may be represented as a depth picture, and similarly to the texture picture, such geometry picture (such as a depth picture) may be encoded and decoded with a video codec. This first geometry picture may be seen to represent a mapping of the first projection surface to the first source volume, and the decoder may use this information to determine the location of geometry primitives in the model to be reconstructed. In order to determine the position of the first source volume and/or the first projection surface and/or the first projection in the scene model, there may be first geometry information encoded into or along the bitstream.

An attribute picture may be defined as a picture that comprises additional information related to an associated texture picture. An attribute picture may for example comprise surface normal, opacity, or reflectance information for a texture picture. A geometry picture may be regarded as one type of an attribute picture, although a geometry picture may be treated as its own picture type, separate from an attribute picture.

Texture picture(s) and the respective geometry picture(s), if any, and the respective attribute picture(s) may have the same or different chroma format.

Terms texture image and texture picture may be used interchangeably. Terms geometry image and geometry picture may be used interchangeably. A specific type of a geometry image is a depth image. Embodiments described in relation to a geometry image equally apply to a depth image, and embodiments described in relation to a depth image equally apply to a geometry image. Terms attribute image and attribute picture may be used interchangeably. A geometry picture and/or an attribute picture may be treated as an auxiliary picture in video/image encoding and/or decoding.

Figure 2A:
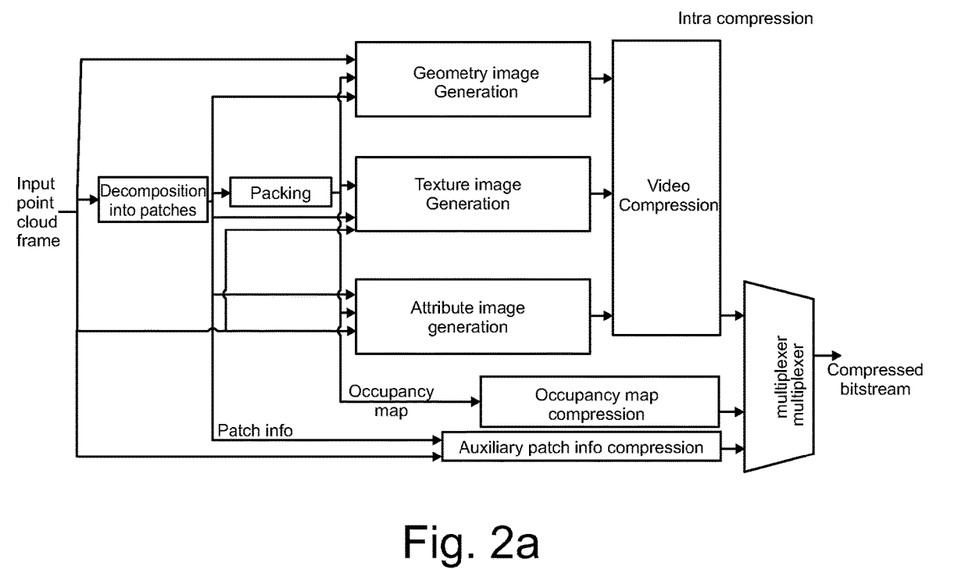
FIGS. 2a and 2b show a compression and a decompression process for 3D volumetric video.
Figure 2B:
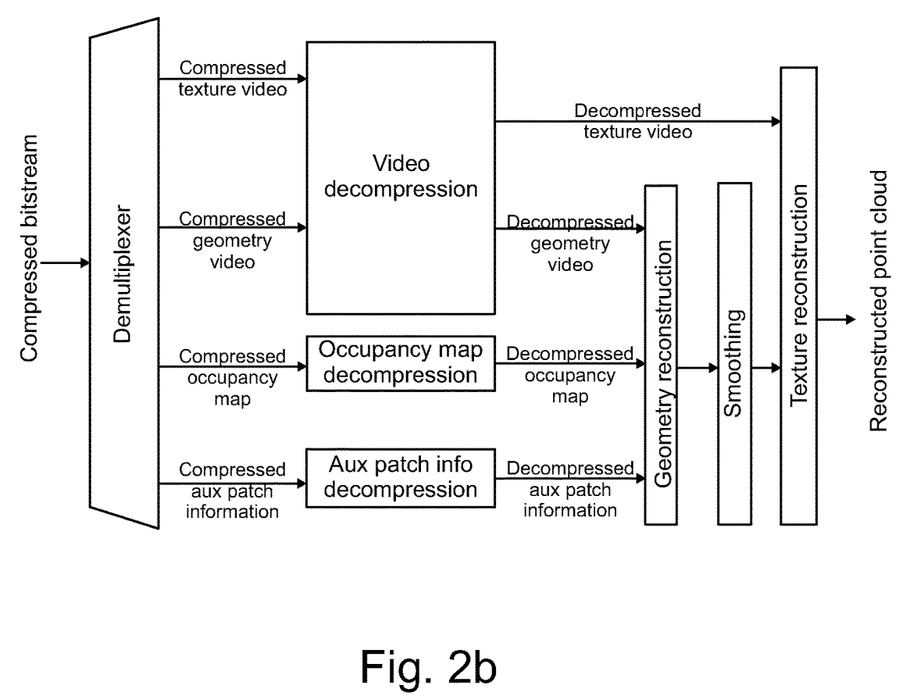

FIGS. 2a and 2b illustrate an overview of exemplified compression/decompression processes. The processes may be applied, for example, in Point Cloud Coding (PCC) according to MPEG standard. MPEG Video-Based Point Cloud Coding (V-PCC), Test Model a.k.a. TMC2v0 (MPEG N18017) discloses a projection-based approach for dynamic point cloud compression. For the sake of illustration, some of the processes related to video-based point cloud compression (V-PCC) compression/decompression are described briefly herein. For a comprehensive description of the model, a reference is made to MPEG N18017.

The patch generation process aims at decomposing the point cloud into a minimum number of patches with smooth boundaries, while also minimizing the reconstruction error. In the V-PCC test model TMC2v0, the following approach is implemented.

First, the normal at every point is estimated and an initial clustering of the point cloud is then obtained by associating each point with one of the following six oriented planes, defined by their normal. More precisely, each point is associated with the plane that has the closest normal (i.e., maximizes the dot product of the point normal and the plane normal).

The initial clustering is then refined by iteratively updating the cluster index associated with each point based on its normal and the cluster indices of its nearest neighbors. The final step consists of extracting patches by applying a connected component extraction procedure.

The packing process aims at mapping the extracted patches onto a 2D grid while trying to minimize the unused space, and guaranteeing that every T×T (e.g., 16×16) block of the grid is associated with a unique patch. Herein, T is a user-defined parameter that is encoded in the bitstream and sent to the decoder.

TMC2v0 uses a simple packing strategy that iteratively tries to insert patches into a W×H grid. W and H are user defined parameters, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current resolution image can fit a patch then the height H of the grid is temporarily doubled and search is applied again. At the end of the process, H is clipped so as to fit the used grid cells.

The image generation process exploits the 3D to 2D mapping computed during the packing process to store the geometry and texture of the point cloud as images. In order to better handle the case of multiple points being projected to the same pixel, each patch is projected onto two images, referred to as layers. More precisely, let H(u,v) be the set of points of the current patch that get projected to the same pixel (u, v). The first layer, also called the near layer, stores the point of H(u,v) with the lowest depth D0. The second layer, referred to as the far layer, captures the point of H(u,v) with the highest depth within the interval [D0, D0+Δ], where Δ is a user-defined parameter that describes the surface thickness.

The generated videos have the following characteristics: geometry: W×H YUV420-8 bit, where the geometry video is monochromatic, and texture: W×H YUV420-8 bit, where the texture generation procedure exploits the reconstructed/smoothed geometry in order to compute the colors to be associated with the re-sampled points.

The padding process aims at filling the empty space between patches in order to generate a piecewise smooth image suited for video compression. TMC2v0 uses a simple padding strategy, which proceeds as follows:

Each block of T×T (e.g., 16×16) pixels is processed independently.

If the block is empty (i.e., all its pixels belong to empty space), then the pixels of the block are filled by copying either the last row or column of the previous T×T block in raster order.

If the block is full (i.e., no empty pixels), nothing is done.

If the block has both empty and filled pixels (i.e. a so-called edge block), then the empty pixels are iteratively filled with the average value of their non-empty neighbors.

The generated images/layers are stored as video frames and compressed using a video codec.

In the auxiliary patch information compression, the following meta data is encoded/decoded for every patch:

Index of the projection plane
Index 0 for the normal planes (1.0, 0.0, 0.0) and (−1.0, 0.0, 0.0)
Index 1 for the normal planes (0.0, 1.0, 0.0) and (0.0, −1.0, 0.0)
Index 2 for the normal planes (0.0, 0.0, 1.0) and (0.0, 0.0, −1.0).

2D bounding box (u0, v0, u1, v1)

3D location (x0, y0, z0) of the patch represented in terms of depth δ0, tangential shift s0 and bi-tangential shift r0. According to the chosen projection planes, (δ0, s0, r0) are computed as follows:
Index 0, δ0=x0, s0=z0 and r0=y0
Index 1, δ0=y0, s0=z0 and r0=x0
Index 2, δ0=z0, s0=x0 and r0=y0

Also, mapping information providing for each T×T block its associated patch index is encoded as follows:

For each T×T block, let L be the ordered list of the indexes of the patches such that their 2D bounding box contains that block. The order in the list is the same as the order used to encode the 2D bounding boxes. L is called the list of candidate patches.

The empty space between patches is considered as a patch and is assigned the special index 0, which is added to the candidate patches list of all the blocks.

Let I be index of the patch to which belongs the current T×T block and let J be the position of I in L. Instead of explicitly encoding the index I, its position J is arithmetically encoded instead, which leads to better compression efficiency.

The occupancy map consists of a binary map that indicates for each cell of the grid whether it belongs to the empty space or to the point cloud. Herein, one cell of the 2D grid produces a pixel during the image generation process. When considering an occupancy map as an image, it may be considered to comprise occupancy patches. Occupancy patches may be considered to have block-aligned edges according to the auxiliary information described in the previous section. An occupancy patch hence comprises occupancy information for a corresponding texture and geometry patches.

The occupancy map compression leverages the auxiliary information described in previous section, in order to detect the empty T×T blocks (i.e., blocks with patch index 0). The remaining blocks are encoded as follows.

The occupancy map could be encoded with a precision of a B0×B0 blocks. B0 is a user-defined parameter. In order to achieve lossless encoding, B0 should be set to 1. In practice B0=2 or B0=4 result in visually acceptable results, while significantly reducing the number of bits required to encode the occupancy map.

The compression process proceeds as follows:

Binary values are associated with B0×B0 sub-blocks belonging to the same T×T block. A value 1 is associated with a sub-block, if it contains at least a non-padded pixel, and 0 otherwise. If a sub-block has a value of 1 it is said to be full, otherwise it is an empty sub-block.

If all the sub-blocks of a T×T block are full (i.e., have value 1). The block is said to be full. Otherwise, the block is said to be non-full.

A binary information is encoded for each T×T block to indicate whether it is full or not.

If the block is non-full, an extra information indicating the location of the full/empty sub-blocks is encoded as follows:

Different traversal orders are defined for the sub-blocks.

The encoder chooses one of the traversal orders and explicitly signals its index in the bitstream.

The binary values associated with the sub-blocks are encoded by using a run-length encoding strategy.

The binary value of the initial sub-block is encoded.

Continuous runs of 0s and 1s are detected, while following the traversal order selected by the encoder.

The number of detected runs is encoded.

The length of each run, except of the last one, is also encoded.

The point cloud geometry reconstruction process exploits the occupancy map information in order to detect the non-empty pixels in the geometry/texture images/layers. The 3D positions of the points associated with those pixels are computed by levering the auxiliary patch information and the geometry images. More precisely, let P be the point associated with the pixel (u, v) and let (δ0, s0, r0) be the 3D location of the patch to which it belongs and (u0, v0, u1, v1) its 2D bounding box. P could be expressed in terms of depth δ (u, v), tangential shift s(u, v) and bi-tangential shift r(u, v) as follows:

$$\delta(u,v)=\delta 0+g(u,v)$$

$$s(u,v)=s0-u0+u$$

$$r(u,v)=r0-v0+v$$

where g(u, v) is the luma component of the geometry image.

The smoothing procedure aims at alleviating potential discontinuities that may arise at the patch boundaries due to compression artifacts. The implemented approach moves boundary points to the centroid of their nearest neighbors.

In the texture reconstruction process, the texture values are directly read from the texture images.

One way to compress a time-varying volumetric scene/object is to project 3D surfaces onto some number of pre-defined 2D planes. Regular 2D video compression algorithms can then be used to compress various aspects of the projected surfaces. For example, a time-varying 3D point cloud, with spatial and texture coordinates, can be mapped into a sequence of at least two sets of planes, where a first set carries the texture data and the second set carries the distance of the mapped 3D surface points from the projection planes. After decoding, a 3D representation is reconstructed by projecting the 2D pixels back into 3D space.

Figure 3A:
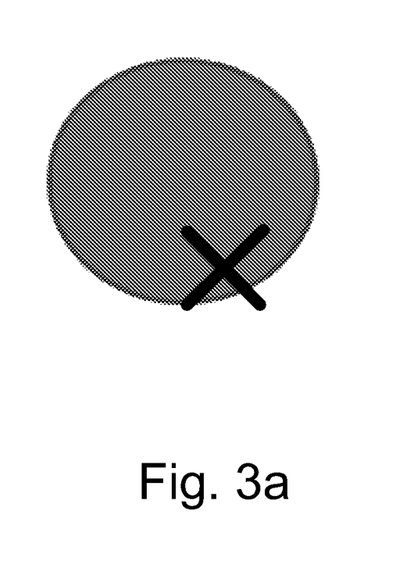
FIGS. 3a-3d show an example of limitations of auxiliary patch information signaling according to prior art.
Figure 3B:
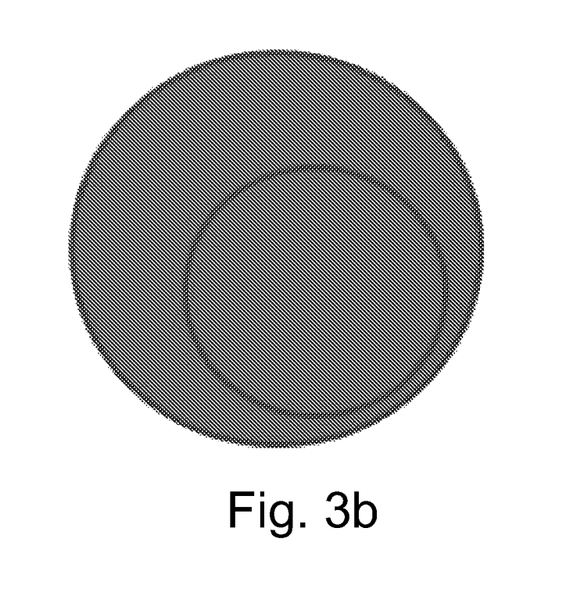
Figure 3C:
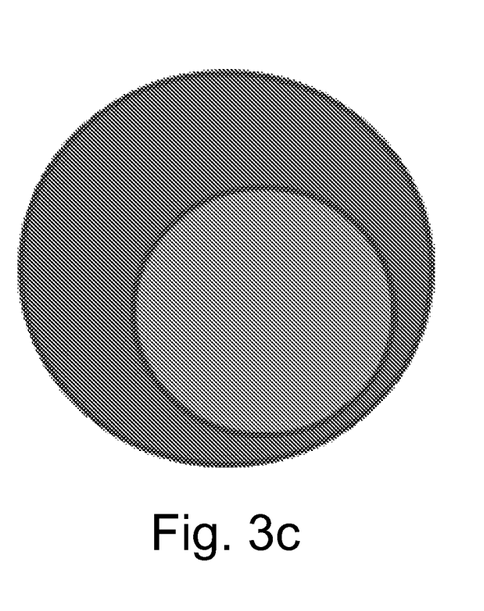
Figure 3D:
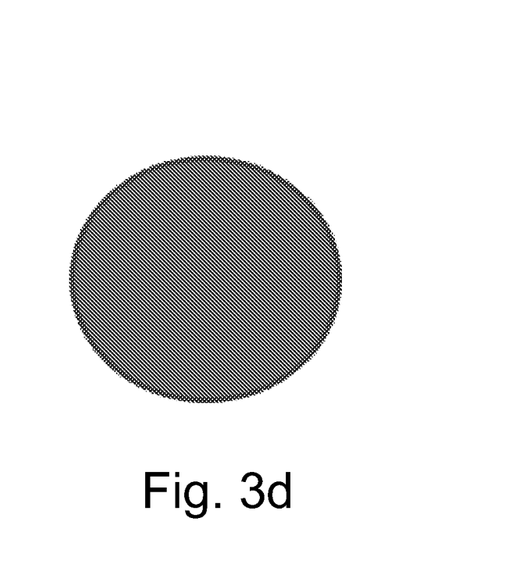

However, the resulting 3D representation does not carry any information about the nature of reconstructed 3D object, i.e. it is only a hollow 3D surface in 3D space. As an example, FIG. 3a shows the top down view of a 3D object (sphere) with the intended viewing position (dark X) inside the 3D volume. FIGS. 3b-3d illustrate possible effects when rendering this view. Either the rear of the intersected sphere hull is shown, i.e. "see-through" (3b), the inside of the sphere is rendered solid, as indicated by the lighter color in 3c, or the viewer/renderer restricts the viewing position to outside the volume, showing the sphere from slightly further distance (3d).

Nevertheless, many applications, for example in medical imaging, immersive media entertainment and autonomous navigation, would benefit from such information, e.g. if a 3D object forms a solid object, or if there are any cavities inside the object.

In the following, an enhanced signalling method for the compression of volumetric 3D data will be described in more detail, in accordance with various embodiments.

Figure 4:
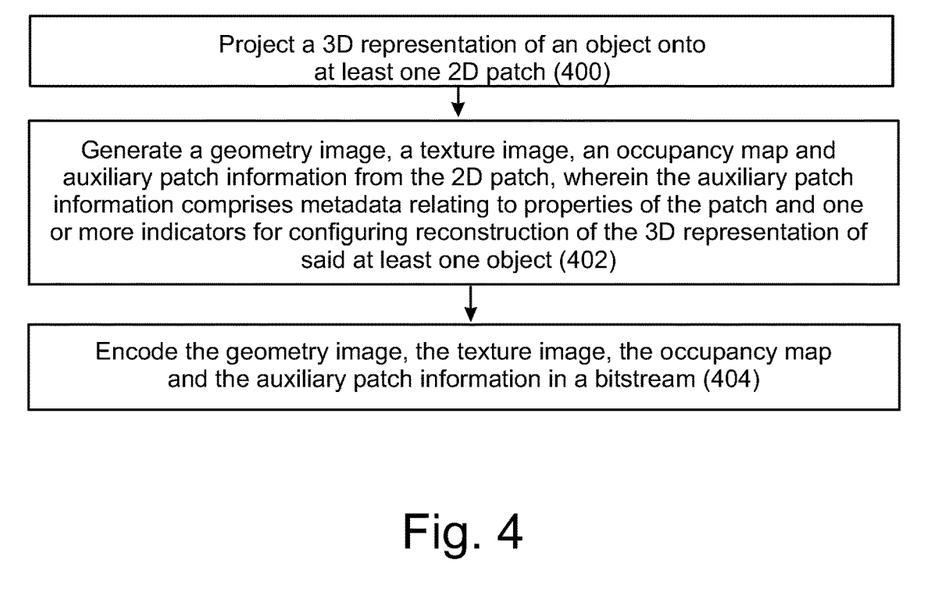
FIG. 4 shows a flow chart for auxiliary patch information signaling according to an embodiment.

A starting point for the method may be considered, for example, that a 3D representation of at least one object, such as a point cloud frame or a 3D mesh, is input in an encoder. The method, which is disclosed in FIG. 4, comprises projecting (400) the 3D representation of the object (represented e.g. by a point cloud frame or a 3D mesh) onto at least one 2D patch; generating (402) a geometry image, a texture image, an occupancy map and auxiliary patch information from the 2D patch, wherein the auxiliary patch information comprises metadata relating to properties of the patch and one or more indicators for configuring reconstruction of the 3D representation of said at least one object; and encoding (404) the geometry image, the texture image, the occupancy map and the auxiliary patch information in or along a bitstream.

Thus, while carrying out the compression of volumetric 3D data for 2D processing, for example according to MPEG V-PCC TMC2v0 compression, the auxiliary patch information is provided with, besides the metadata relating to properties of the patch, but also one or more indicators for configuring reconstruction of the 3D representation of said at least one object upon decompression stage. Accordingly, various information may be provided therein to support indicating the nature of the reconstructed 3D content in video-based point cloud compression and possible interactions in rendering and/or displaying and/or interacting with such reconstructed content.

According to an embodiment, said one or more indicators provide a sequence-level signalling for configuring reconstruction of the 3D representation of all objects represented by all patches within said bitstream.

The auxiliary information bit stream syntax of V-PCC is disclosed in the document MPEG N18180, also referred to as ISO/IEC 23090-5:2018(E) "Study of CD". Said sequence-level signalling may be implemented by introducing said one or more indicators in Sequence parameter set syntax, currently disclosed in paragraph 7.3.6 of MPEG N18180.

According to an embodiment, a syntax element, which may be referred to as sps_sequence_volume_indicator, is added to a Sequence parameter set syntax or any other suitable syntax structure for ISO/IEC 23090-5 (or similar volumetric video coding technology). As shown in Table 1, sps_sequence_volume_indicator may indicate how all 3D models reconstructed from this bitstream shall be rendered and/or reconstructed.

TABLE 1

| (ISO/IEC 23090-5 example) | |
|---|---|
| | Descriptor |
| sequence_parameter_set( ) { | |
| profile_tier_level( ) | |
| sps_sequence_parameter_set_id | u(4) |
| sps_frame_width | u(16) |
| sps_frame_height | u(16) |
| ... | |
| sps_sequence_volume_indicator | u(1)/u(n) |
| byte_alignment( ) | |
| } | |

According to an embodiment, such a syntax element is implemented as a flag, e.g. u(1), indicating Object Volume, i.e. if a model shall be rendered as empty or solid.

According to an embodiment, such a syntax element is implemented as consisting of a n-bit signal (u(n)). Thus, such a syntax element can use more elaborate signalling for indicating Object Volume (OV), i.e. if a model shall be rendered as empty or solid, and if it is solid, how the inside shall be rendered. Also, signalling may include, if it is allowed to intersect with the model.

For example, following signalling consisting of a n=2 bit signal may be used:

OV=00→render empty
OV=01→render solid, interpolate color
OV=10→render solid, default color
OV=11→restrict renderer volume interaction Various syntax elements with various length can be used to define the actual filling in more detail. Signalling may include one or more of the following elements:

Interpolation method: How to interpolate texture color for solid rendering, i.e. interpolation neighborhood, interpolate to default, interpolation weighting, etc.

Default color: Default colour to render inside volume. Such a color could either be hard coded or signalled per scene, sequence, object, frame, GOP, etc.

Default transparency: Default transparency to render points inside volume.

Default point shape info: Default point size, shape, and/or orientation to render points inside volume.

Volume interaction (VI): Defines what happens if the viewing position is intersecting the 3D volume.

According to an embodiment, when the viewing point intersects with a 3D volume for which restricted render volume interaction (VI) is signalled, one of the following happens:

The viewpoint is restricted from moving any further into the direction, i.e. moving inside the 3D volume (restrict movement).

The object is moved away to keep the viewpoint outside the 3D volume, if there are more than one 3D volume in the scene, these are moved as well (fixed absolute movement, e.g. for AR scenery).

The object is moved away to keep the viewpoint outside the 3D volume, if there are more than one 3D volume in the scene, these remain fixed (fixed relative movement, e.g. for AR scenery).

Two or more of the embodiments as described above may be combined, and they may be introduced as one or more indicators in Sequence parameter set syntax or any other suitable syntax structure for ISO/IEC 23090-5 (or similar volumetric video coding technology).

Table 2 discloses an example, where the Sequence parameter set syntax is enabled for a simple signalling of volume plus rendering information, wherein if sps_sequence_volume_indicator is signalled, a single RGB color value is signalled on how to fill the inside volume.

TABLE 2

(ISO/IEC 23090-5 example).

|  | Descriptor |
|---|---|
| sequence_parameter_set( ) { |  |
|   profile_tier_level( ) |  |
|   sps_sequence_parameter_set_id | u(4) |
|   sps_frame_width | u(16) |
|   sps_frame_height | u(16) |
|   ... |  |
|   sps_sequence_volume_indicator | u(1) |
|   if sps_sequence_volume_indicator == 1 { |  |
|     sps_sequence_volume_red | u(8) |
|     sps_sequence_volume_green | u(8) |
|     sps_sequence_volume_blue | u(8) |
|   } |  |
|   byte_alignment( ) |  |
| } |  |

Table 3 discloses another example, where an advanced signalling of volume plus rendering information is enabled, where the syntax element example sps_sequence_volume_indicator is signalled according to the 2-bit OV examples, as described above. Moreover, a further indicator example, sps_sequence_volume_interaction, is included to indicate the behavior if a viewpoint is interaction with the 3D volume surface, for example as follows:

VI=00→restrict movement
VI=01→fixed absolute movement
VI=10→fixed relative movement
VI=11→reserved

TABLE 3

(ISO/IEC 23090-5 example).

|  | Descriptor |
|---|---|
| sequence_parameter_set( ) { |  |
|   profile_tier_level( ) |  |
|   sps_sequence_parameter_set_id | u(4) |
|   sps_frame_width | u(16) |
|   sps_frame_height | u(16) |
|   ... |  |
|   sps_sequence_volume_indicator | u(2) |
|   if sps_sequence_volume_indicator == 01 { |  |
|     sps_sequence_volume_interpolation_filter | u(2) |
|     sps_sequence_volume_interpolation_kernel | u(8) |
|   } |  |
|   if sps_sequence_volume_indicator == 10 { |  |
|     sps_sequence_volume_red | u(8) |
|     sps_sequence_volume_green | u(8) |
|     sps_sequence_volume_blue | u(8) |
|   } |  |
|   if sps_sequence_volume_indicator == 11 { |  |
|     sps_sequence_volume_interaction | u(2) |
|   } |  |
|   byte_alignment( ) |  |
| } |  |

According to an embodiment, said one or more indicators provide an object-level signalling for configuring reconstruction of the 3D representation of one or more objects represented by one or more patches within said bitstream. Said object-level signalling may be implemented by introducing said one or more indicators in Geometry patch parameters syntax, currently disclosed in paragraph 7.3.22 of MPEG N18180, or any other suitable syntax structure for ISO/IEC 23090-5 (or similar volumetric video coding technology).

According to an embodiment, a syntax element or signal, which may be referred to as gpm_geometry_patch_volume_indicator, is added in Geometry patch parameters syntax, or any other suitable syntax structure for ISO/IEC 23090-5 (or similar volumetric video coding technology).

Such modifications enable similar signalling as presented above as sequence-level signalling to be indicated as object-level signalling. For instance, the example shown in Table 2 may be represented on a per-object level in the geometry patch parameter set of every patch forming a particular 3D volume with the signalling shown in Table 4.

TABLE 4

(ISO/IEC 23090-5 example).

|  | Descriptor |
|---|---|
| geometry_patch_params( ) { |  |
|   ... |  |
|   if( gfps_geometry_patch_point_shape_info_enabled_flag ) { |  |
|     gpm_geometry_patch_point_shape_info_present_flag | u(1) |
|     if( gpm_geometry_patch_point_shape_info_present_flag ) |  |

TABLE 4-continued (ISO/IEC 23090-5 example).

| | Descriptor |
|---|---|
| gpm_geometry_patch_point_shape_info | u(8) |
| } | |
| gpm_geometry_patch_volume_indicator | u(1) |
| if sps_sequence_volume_indicator == 1 { | |
| gpm_geometry_patch_volume_red | u(8) |
| gpm_geometry_patch_volume_green | u(8) |
| gpm_geometry_patch_volume_blue | u(8) |
| } | |
| } | |

According to an embodiment, signalling of various elements of the volume rendering aspects such as interpolation method, default color, default transparency, default point shape info and/or volume interaction (VI) may be either hard coded, or signalled on a per-sequence, per-object, or per-patch level.

Figure 5:
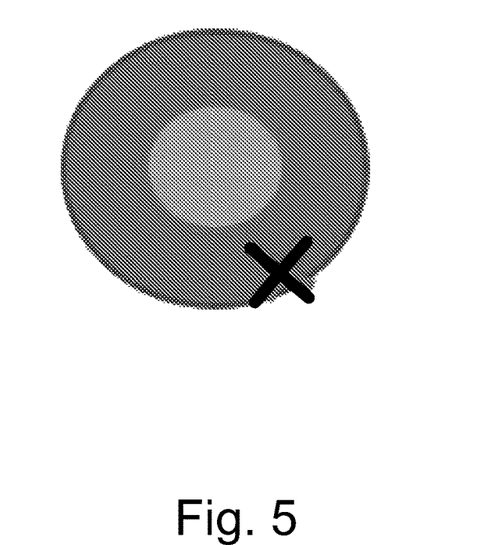
FIG. 5 shows an example of auxiliary patch information signaling for nested volumes according to an embodiment.

According to an embodiment, if a 3D volume is nested inside another 3D volume, e.g. a sphere inside a larger sphere as shown in FIG. 5, volume rendering information is derived in one of the following ways:
  a) If outer (dark) volume is solidly rendered, inner volume is hidden until the viewing point intersects with it.
  b) If outer (dark) volume is solidly rendered but has transparency signaled, inner volume is revealed up to that transparency level and shown fully once the viewing point intersects with it.
  c) outer (dark) volume is not solidly rendered, inner volume fully visible
  d) any signaled volume interaction for the outer volume overrides the inner IV signal. For relative movements, both volumes are considered as one.
  e) any signaled volume interaction for the inner volume considers both volumes as one.

According to an embodiment, said one or more indicators provide a patch-level signalling for configuring reconstruction of the 3D representation of a 3D surface represented by said patch within said bitstream. Thus, the patch-level signalling indicates how a single 3D surface, represented by the particular patch within the V-PCC bitstream, shall be interacted with. As no volume is formed in this embodiment, only the interaction aspect is signalled. This embodiment allows for restricting the volume interaction for certain sides of a volume, e.g. a user is only allowed to look inside an object from certain sides, while from other sides the viewpoint is not allowed to intersect with the patch.

According to an embodiment, one or more of the above described volume signalling embodiments are present in the same V-PCC bit stream, i.e. a global sequence-level indicates certain volume aspects, while certain objects have additional signalling on object-level present. This information may be additive, e.g. no interaction was specified on sequence-level, but interaction is specified for some certain objects, or contradicting, e.g. sequence-level signalling that all objects shall be rendered as solid, filled with color red, but certain objects have per-object level signalling to be rendered solid with color blue.

For contradicting signalling, per-patch level signalling overrides per-object level signalling, and per-object level signalling overrides per-sequence signalling.

Consequently, the embodiments as described herein enable to define clear rendering aspects for configuring reconstruction of the 3D representation of objects, especially in V-PCC coded 3D volumes. Moreover, viewpoint interactions are clarified with V-PCC coded 3D volumes. The flexibility of V-PCC also increases to address more complex use cases, e.g. in medical imaging.

Figure 6:
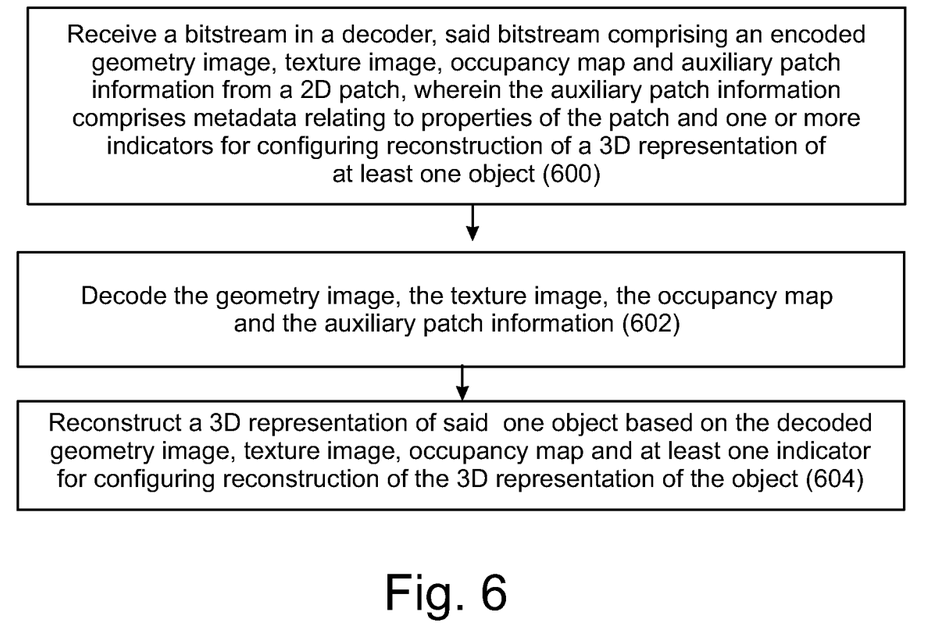
FIG. 6 shows a flow chart for reconstructing patches based on the auxiliary patch information signaling according to an embodiment.

Further aspects relate to the operation of a decoder. FIG. 6 shows an example of a decoding method comprising receiving (600) a bitstream in a decoder, said bitstream comprising an encoded geometry image, texture image, occupancy map and auxiliary patch information from a 2D patch, wherein the auxiliary patch information comprises metadata relating to properties of the patch and one or more indicators for configuring reconstruction of a 3D representation of at least one object; decoding (602) the geometry image, the texture image, the occupancy map and the auxiliary patch information; and reconstructing (604) a 3D representation of said at least one object based on the decoded geometry image, texture image, occupancy map and at least one indicator for configuring reconstruction of the 3D representation of the object.

Thus, the decoder receives and decodes the geometry image, texture image, occupancy map and auxiliary patch information at least one 2D patch. From the auxiliary patch information, the decoder decodes, besides the metadata relating to properties of the patch, also one or more indicators for configuring reconstruction of a 3D representation of at least one object. The 3D representation of one or more objects is then reconstructed based on the decoded geometry image, texture image, occupancy map and at least one indicator for configuring reconstruction of the 3D representation of the object.

An apparatus according to an aspect comprises at least one processor and at least one memory, said at least one memory stored with computer program code thereon, the at least one memory and the computer program code configured to, with the at least one processor, cause the apparatus at least to perform: project a 3D representation of at least one object onto at least one 2D patch; generate a geometry image, a texture image, an occupancy map and auxiliary patch information from the 2D patch, wherein the auxiliary patch information comprises metadata relating to properties of the patch and one or more indicators for configuring reconstruction of the 3D representation of said at least one object; and encode the geometry image, the texture image, the occupancy map and the auxiliary patch information in or along a bitstream.

An apparatus according to a further aspect comprises at least one processor and at least one memory, said at least one memory stored with computer program code thereon, the at least one memory and the computer program code configured to, with the at least one processor, cause the apparatus at least to perform: receive a bitstream in a decoder, said bitstream comprising an encoded geometry image, texture image, occupancy map and auxiliary patch information from a 2D patch, wherein the auxiliary patch information comprises metadata relating to properties of the patch and one or more indicators for configuring reconstruction of a 3D representation of at least one object; decode the geometry image, the texture image, the occupancy map and the auxiliary patch information; and reconstruct a 3D representation of said at least one object based on the decoded geometry image, texture image, occupancy map and at least one indicator for configuring reconstruction of the 3D representation of the object.

In the above, some embodiments have been described with reference to encoding. It needs to be understood that said encoding may comprise one or more of the following: encoding source image data into a bitstream, encapsulating the encoded bitstream in a container file and/or in packet(s)

or stream(s) of a communication protocol, and announcing or describing the bitstream in a content description, such as the Media Presentation Description (MPD) of ISO/IEC 23009-1 (known as MPEG-DASH) or the IETF Session Description Protocol (SDP). Similarly, some embodiments have been described with reference to decoding. It needs to be understood that said decoding may comprise one or more of the following: decoding image data from a bitstream, decapsulating the bitstream from a container file and/or from packet(s) or stream(s) of a communication protocol, and parsing a content description of the bitstream, In the above, where the example embodiments have been described with reference to an encoder or an encoding method, it needs to be understood that the resulting bitstream and the decoder or the decoding method may have corresponding elements in them. Likewise, where the example embodiments have been described with reference to a decoder, it needs to be understood that the encoder may have structure and/or computer program for generating the bitstream to be decoded by the decoder.

In the above, some embodiments have been described with reference to encoding or decoding texture pictures, geometry pictures, (optionally) attribute pictures and auxiliary patch information into or from a single bitstream. It needs to be understood that embodiments can be similarly realized when encoding or decoding texture pictures, geometry pictures, (optionally) attribute pictures and auxiliary patch information into or from several bitstreams that are associated with each other, e.g. by metadata in a container file or media presentation description for streaming.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

Various aspects can be summarized with the following non-exhaustive list of examples.

According to a first example, there is provided a method comprising:
  projecting a 3D representation of at least one object onto at least one 2D patch;
  generating a geometry image, a texture image, an occupancy map and auxiliary patch information from the 2D patch, wherein the auxiliary patch information comprises metadata relating to properties of the patch and one or more indicators for configuring reconstruction of the 3D representation of said at least one object; and
  encoding the geometry image, the texture image, the occupancy map and the auxiliary patch information in or along a bitstream.

According to a second example, there is provided an apparatus comprising at least one processor and at least one memory, said at least one memory stored with computer program code thereon, the at least one memory and the computer program code configured to, with the at least one processor, cause the apparatus at least to perform: project a 3D representation of at least one object onto at least one 2D patch; generate a geometry image, a texture image, an occupancy map and auxiliary patch information from the 2D patch, wherein the auxiliary patch information comprises metadata relating to properties of the patch and one or more indicators for configuring reconstruction of the 3D representation of said at least one object; and encode the geometry image, the texture image, the occupancy map and the auxiliary patch information in a bitstream.

According to a third example, there is provided an apparatus comprising:
  means for projecting a 3D representation of at least one object onto at least one 2D patch;
  means for generating a geometry image, a texture image, an occupancy map and auxiliary patch information from the 2D patch, wherein the auxiliary patch information comprises metadata relating to properties of the patch and one or more indicators for configuring reconstruction of the 3D representation of said at least one object; and
  means for encoding the geometry image, the texture image, the occupancy map and the auxiliary patch information in a bitstream.

According to an embodiment, said one or more indicators provide a sequence-level signalling for configuring reconstruction of the 3D representation of all objects represented by all patches within said bitstream.

According to an embodiment, a syntax element, which may be referred to as sps_sequence_volume_indicator, is added to a sequence parameter set syntax or any other suitable syntax structure for ISO/IEC 23090-5 (or similar volumetric video coding technology).

According to an embodiment, said one or more indicators provide an object-level signalling for configuring reconstruction of the 3D representation of one or more objects represented by one or more patches within said bitstream.

According to an embodiment, a syntax element, which may be referred to as gpm_geometrypatch_volume_indicator, is added to a geometry patch parameters syntax or any other suitable syntax structure for ISO/IEC 23090-5 (or similar volumetric video coding technology).

According to an embodiment, said one or more indicators provide a patch-level signalling for configuring reconstruction of the 3D representation of a 3D surface represented by said patch within said bitstream.

According to a fourth example, there is provided a method comprising:

receiving a bitstream in a decoder, said bitstream comprising an encoded geometry image, texture image, occupancy map and auxiliary patch information from a 2D patch, wherein the auxiliary patch information comprises metadata relating to properties of the patch and one or more indicators for configuring reconstruction of a 3D representation of at least one object;

decoding the geometry image, the texture image, the occupancy map and the auxiliary patch information; and reconstructing a 3D representation of said at least one object based on the decoded geometry image, texture image, occupancy map and at least one indicator for configuring reconstruction of the 3D representation of the object.

According to a fifth example, there is provided an apparatus comprising at least one processor and at least one memory, said at least one memory stored with computer program code thereon, the at least one memory and the computer program code configured to, with the at least one processor, cause the apparatus at least to perform: receive a bitstream in a decoder, said bitstream comprising an encoded geometry image, texture image, occupancy map and auxiliary patch information from a 2D patch, wherein the auxiliary patch information comprises metadata relating to properties of the patch and one or more indicators for configuring reconstruction of a 3D representation of at least one object; decode the geometry image, the texture image, the occupancy map and the auxiliary patch information; and reconstruct a 3D representation of said at least one object based on the decoded geometry image, texture image, occupancy map and at least one indicator for configuring reconstruction of the 3D representation of the object.

According to a sixth example, there is provided an apparatus comprising:

means for receiving a bitstream in a decoder, said bitstream comprising an encoded geometry image, texture image, occupancy map and auxiliary patch information from a 2D patch, wherein the auxiliary patch information comprises metadata relating to properties of the patch and one or more indicators for configuring reconstruction of a 3D representation of at least one object;

means for decoding the geometry image, the texture image, the occupancy map and the auxiliary patch information; and means for reconstructing a 3D representation of said at least one object based on the decoded geometry image, texture image, occupancy map and at least one indicator for configuring reconstruction of the 3D representation of the object.

The invention claimed is:

1. A method comprising:

projecting a three-dimensional representation of at least one object onto at least one two-dimensional patch;

generating a geometry image, a texture image, an occupancy map and auxiliary patch information from the at least one two-dimensional patch, wherein the auxiliary patch information comprises metadata relating to properties of the at least one two-dimensional patch and one or more indicators for configuring reconstruction of the three-dimensional representation of said at least one object;

wherein the one or more indicators of the auxiliary patch information comprises information relating to how a user interacts with a three-dimensional surface represented with the at least one two-dimensional patch depending on a viewpoint of the user;

wherein the one or more indicators of the auxiliary patch information provides per sequence level signaling, per object level signaling, or per patch level signaling for configuring reconstruction of the three-dimensional representation of the at least one object represented within a bitstream; and encoding the geometry image, the texture image, the occupancy map and the auxiliary patch information in or along the bitstream.

2. The method according to claim 1, wherein the one or more indicators provides the per sequence level signaling for configuring reconstruction of the three-dimensional (3D) representation of the at least one object represented within the bitstream.

3. The method according to claim 2, wherein a syntax element is added to a sequence parameter set syntax or any other syntax structure suitable for providing the per sequence level signaling.

4. The method according to claim 1, wherein the one or more indicators provides the per object level signaling for configuring reconstruction of the three-dimensional (3D) representation of the at least one object represented by one or more patches within the bitstream.

5. The method according to claim 4, wherein a syntax element is added to a geometry patch parameters syntax or any other syntax structure suitable for providing the per object level signaling.

6. The method according to claim 1, wherein the one or more indicators provides the per patch level signaling for configuring reconstruction of the three-dimensional (3D) representation of the 3D surface represented by the two-dimensional (2D) patch within said bitstream.

7. The apparatus according to claim 6, wherein a syntax element is added to a geometry patch parameters syntax or any other syntax structure suitable for providing the per patch level signaling.

8. The method of claim 1, wherein the one or more indicators of the auxiliary patch information indicates whether the user is allowed to view inside the at least one object from a given side.

9. The method of claim 1, wherein the one or more indicators for configuring reconstruction of the three-dimensional (3D) representation of the at least one object indicates that rendering the reconstruction of the three-dimensional object is based on an inner three-dimensional volume being nested inside an outer three-dimensional volume.

10. The method of claim 9, further comprising performing at least one of:

hiding the inner three-dimensional volume until the viewpoint of the user intersects with the inner three-dimensional volume, in response to the outer three-dimensional volume being solidly rendered, or revealing the inner three-dimensional volume up to a signaled transparency level, and showing the inner three-dimensional volume fully once the viewpoint of the user intersects with the inner three-dimensional volume, in response to the outer three-dimensional volume being solidly rendered, or rendering the inner three-dimensional volume to be fully visible, wherein the outer three-dimensional volume is not solidly rendered, or rendering the inner three-dimensional volume and the outer three-dimensional volume such that signaled volume interaction for the outer three-dimensional volume overrides signaled volume interaction for the inner three-dimensional volume, wherein for relative movements, the inner three-dimensional volume and the outer three-dimensional volume are considered as one three-dimensional volume, or rendering the inner three-dimensional volume and the outer three-dimensional volume such that signaled volume interaction for the inner three-dimensional volume considers the inner three-dimensional volume and the outer three-dimensional volume as one three-dimensional volume.

11. A non-transitory computer readable medium including instructions stored thereon for performing at least the method of claim 1.

12. The method of claim 1, for contradictory signaling, the per patch level signaling overrides the per object level signaling, and the per object level signaling overrides the per sequence level signaling.

13. An apparatus comprising:
at least one processor; and
at least one memory storing instructions that, when executed by the at least one processor, cause the apparatus at least to:
project a three-dimensional representation of at least one object onto at least one two-dimensional patch;
generate a geometry image, a texture image, an occupancy map and auxiliary patch information from the at least one two-dimensional patch, wherein the auxiliary patch information comprises metadata relating to properties of the at least one two-dimensional patch and one or more indicators for configuring reconstruction of the three-dimensional representation of said at least one object;
wherein the one or more indicators of the auxiliary patch information comprises information relating to how a user interacts with a three-dimensional surface represented with the at least one two-dimensional patch depending on a viewpoint of the user;
wherein the one or more indicators of the auxiliary patch information provides per sequence level signaling, per object level signaling, or per patch level signaling for configuring reconstruction of the three-dimensional representation of the at least one object represented within a bitstream; and
encode the geometry image, the texture image, the occupancy map and the auxiliary patch information in or along the bitstream.

14. The apparatus according to claim 13, wherein the one or more indicators provide the per sequence level signaling for configuring reconstruction of the three-dimensional (3D) representation of the at least one object represented within the bitstream.

15. The apparatus according to claim 14, wherein a syntax element is added to a sequence parameter set syntax or any other syntax structure suitable for providing the per sequence level.

16. The apparatus according to claim 13, wherein the one or more indicators provides the per object level signaling for configuring reconstruction of the three-dimensional (3D) representation of the at least one object represented by one or more patches within the bitstream.

17. The apparatus according to claim 16, wherein a syntax element is added to a geometry patch parameters syntax or any other syntax structure suitable for providing the per object level signaling.

18. The apparatus according to claim 13, wherein the one or more indicators provides the per patch level signaling for configuring reconstruction of the three-dimensional (3D) representation of the 3D surface represented by the two-dimensional patch within the bitstream.

19. The apparatus according to claim 18, wherein a syntax element is added to a geometry patch parameters syntax or any other syntax structure suitable for providing the per patch level signaling.

20. A method comprising:
receiving a bitstream in a decoder, said bitstream comprising an encoded geometry image, texture image, occupancy map and auxiliary patch information from a two-dimensional patch, wherein the auxiliary patch information comprises metadata relating to properties of the two-dimensional patch and one or more indicators for configuring reconstruction of a three-dimensional representation of at least one object;
decoding the geometry image, the texture image, the occupancy map and the auxiliary patch information;
wherein the one or more indicators of the auxiliary patch information comprises information relating to how a user interacts with a three-dimensional surface represented with the two-dimensional patch depending on a viewpoint of the user;
wherein the one or more indicators of the auxiliary patch information provides per sequence level signaling, per object level signaling, or per patch level signaling for configuring reconstruction of the three-dimensional representation of the at least one object represented within the bitstream; and
reconstructing a three-dimensional representation of said at least one object based on the decoded geometry image, texture image, occupancy map and the one or more indicators for configuring reconstruction of the three-dimensional representation of the object.

21. An apparatus comprising:
at least one processor; and
at least one memory storing instructions that, when executed by the at least one processor, cause the apparatus at least to:
receive a bitstream in a decoder, said bitstream comprising an encoded geometry image, texture image, occupancy map and auxiliary patch information from a two-dimensional patch, wherein the auxiliary patch information comprises metadata relating to properties of the two-dimensional patch and one or more indicators for configuring reconstruction of a three-dimensional representation of at least one object;
decode the geometry image, the texture image, the occupancy map and the auxiliary patch information;
wherein the one or more indicators of the auxiliary patch information comprises information relating to how a user interacts with a three-dimensional surface represented with the two-dimensional patch depending on a viewpoint of the user;
wherein the one or more indicators of the auxiliary patch information provides per sequence level signaling, per object level signaling, or per patch level signaling for configuring reconstruction of the three-dimensional representation of the at least one object represented within the bitstream; and reconstruct a three-dimensional representation of said at least one object based on the decoded geometry image, texture image, occupancy map and the one or more indicators for configuring reconstruction of the three-dimensional representation of the object.

* * * * *